United States Patent [19]

Fock et al.

[11] 4,207,379

[45] Jun. 10, 1980

[54] SUBSTRATE WEB COATED WITH A THERMOSETTING COATING RESIN

[75] Inventors: Jürgen Fock, Düsseldorf; Eckehard Schamberg; Werner Schäfer, both of Essen, all of Fed. Rep. of Germany

[73] Assignee: Th. Goldschmidt AG, Fed. Rep. of Germany

[21] Appl. No.: 929,408

[22] Filed: Jul. 31, 1978

[30] Foreign Application Priority Data

Aug. 1, 1977 [DE] Fed. Rep. of Germany ....... 2734669

[51] Int. Cl.$^2$ .................... B32B 27/06; B32B 21/08; B32B 23/08
[52] U.S. Cl. ................... 428/480; 428/514; 428/528; 428/529; 428/530; 428/531; 427/335; 427/358; 427/371; 427/391; 427/411
[58] Field of Search ............ 428/480, 514, 528–531; 427/335, 358, 371, 391, 411

[56] References Cited

U.S. PATENT DOCUMENTS

| | | |
|---|---|---|
| 3,793,282 | 2/1974 | Fock et al. .................. 260/31.8 M |
| 3,853,594 | 12/1974 | Moroff et al. ..................... 428/514 |
| 4,061,823 | 12/1977 | McCaskey, Jr. et al. ........... 428/528 |

FOREIGN PATENT DOCUMENTS

| | | |
|---|---|---|
| 50-29683 | 3/1975 | Japan ......................... 428/514 |
| 51-31728 | 3/1976 | Japan ......................... 428/514 |

OTHER PUBLICATIONS

Derwent Abstract, 72256R-A, German, DT-19150-26-Q.

*Primary Examiner*—P. C. Ives
*Attorney, Agent, or Firm*—James E. Bryan

[57] ABSTRACT

This invention relates to an improvement in a substrate web coated with a thermosetting coating resin and optionally impregnated with an aminoplast resin, in particular a web of paper, for the surface finishing of woodwork panels or laminates, the improvement that the coating resin is a modified polyester resin, composed of (a) 60 to 95% by weight of a hardenable polyester resin, (b) 1 to 15% by weight of a cross-linking agent for the polyester resin, (c) 5 to 40% by weight of a thermoplastic containing predominantly linear, high-molecular weight, reactive groups, (d) 1 to 15% by weight of a monomer with at least one polymerizable double bond and at least one group which reacts with the reactive group of the thermoplastic, and (e) a hardening catalyst, and optionally dyes, pigments and/or fillers. The invention also relates to a process for preparing a synthetic resin coated substrate web.

15 Claims, No Drawings

SUBSTRATE WEB COATED WITH A THERMOSETTING COATING RESIN

The invention relates to a substrate web, especially paper, coated with a thermosetting coating resin and, where appropriate, also impregnated with aminoplast resins, for the surface-finishing of woodwork materials or laminated materials.

It is known to coat the surfaces of woodwork panels with substrate webs containing low-molecular weight, thermosetting synthetic resins, in particular condensation resins. Such synthetic resins are, for instance, precondensates of phenol-formaldehyde resins or urea resins or melamine-formaldehyde resins. These resins provide thermosetting, very hard, and abrasion-resistant coatings. The resins are deposited as solutions or dispersions on substrate webs, in particular on webs of paper, and following drying they are pressed together with the substrate web onto the surface to be finished. The paper webs additionally are coated with synthetic resin to obtain crack-proof coatings. The impregnated and coated substrate webs however in general are quite brittle, and thereby their working properties are much affected.

It is further known to coat substrate webs with synthetic resins which harden by polymerization. Suitable resins, for instance, are prepolymerizates of diallyl phthalate or condensation resins from unsaturated carboxylic acids and diols. Again these resins result in hard, abrasion-proof surfaces. However no method is known yet, by which such synthetic resins can be processed into non-adhering and storagestable synthetic-resin coated substrate webs already when in the unprocessed state.

The object of German Offenlegungsschrift No. 1,915,026, is a process to improve the hardness and the scratch-resistance of thermoplastics and in the process the thermoplastics are mixed well with unsaturated polyesters, cross-linking means for unsaturated polyesters and polymerization catalysts, possibly also with accelerators, and the unsaturated polyesters subsequently are made to crosslink in the thermoplastic synthetic without reacting therewith. The proportion of the unsaturated polyesters or epoxy resins added to the thermoplastic should be between 10 to 50, preferably 20 to 30% by weight. It is very important in this respect that the thermoplastic properties be retained and that a reaction between the unsaturated polyesters and the thermoplastic be avoided. The thermoplastic quality of the product of the process is retained, and it hardness and scratch resistance are improved.

German Pat. No. 2,212,928, discloses how to manufacture thermosetting coating foils composed of high molecular weight (co)polymerizates such as (meth)acrylic acid esters. Hardening in these polymerizates takes place by condensing the reactive groups that were polymerized into them, for instance hydroxyl, amide and methoxymethylamide groups. These polymerizates, however, when in the hardened state have only a relatively low crosslinking density and therefore do not constitute thermosetting plastics. Compared to genuine thermosetting plastic surfaces, their surfaces are of low strength. Therefore, these polymerizates are unsuited for many applications, for instance to coat panels which will be stressed.

The present invention addresses the problem of creating a support web which is flexible, of long storage life, coated with a non-adhering synthetic resin and which in the hardened state forms a crack-less, hard, scratch-and-abrasion resistant surface.

Surprisingly, it was found that these and other advantageous properties are combined in a synthetic resin coated substrate web, which may be impregnated with aminoplast resins, in which the coating resin is a modified polyester resin composed of (a) 60 to 95% by weight of a hardenable polyester resin, (b) 1 to 15% by weight of a crosslinking agent for the polyester resin, (c) 5 to 40% by weight of a thermoplastic comprising predominantly linear, high-molecular weight, reactive groups, (d) 1 to 15% by weight of a monomer with at least one polymerizable double bond and at least one group which reacts under the conditions of hardening with the reactive group of the thermoplastic, and (e) a hardening catalyst and, where appropriate, dyes, pigments and/or fillers.

The content of polyester resin in the coating resin preferably is from 60 to 80% by weight, and that of the thermoplast containing reactive groups from 10 to 15% by weight.

The above stated weight ratios result from the requirements initially set. If the content of hardenable polyester resin is too low, such application properties as hardness, temperature and solvent resistance are decreased.

The content of the crosslinking agent for the polyester resin preferably is from 5 to 10% by weight.

The monomers cited under (d), which can react both with the hardenable polyester resin and the thermoplastic, preferably are present in a proportion of 2 to 5% by weight in the coating resin.

The known hardenable polyester resins of the state of the art are suitable for the coating resin of the invention. These resins are low-molecular weight reaction products from dicarboxylic acids with at least one reactive double bond in the molecule, for instance maleic acid, fumaric acid, or a phthalic acid with diols, for instance glycols or bisphenols. The reaction partners furthermore may be halogen-substituted, in particular they may contain bromine, whereby the flammability-resistance of the polyester resins is improved.

One or several monomers with at least two reactive non-conjugated double bonds in the molecule are used as crosslinking agents. Examples of such monomers are:

Diacrylic esters from divalent alcohols, for instance ethylene glycol or propylene glycol, dimethyl acrylic esters of butanediol-1,4, also divinyl benzene or trivinylbenzene, diallyl phthalate or trimethylolpropane trimethacrylate, allyl esters, methallyl esters or crotyl esters of acrylic or methacrylic acid, maleic, fumaric or itaconic acids and vinylesters of allyl acetic acid.

These additives permit crosslinking the synthetic resin and thus induce hardening. The required proportion of radically cross-linking monomers depends upon the optimal hardening characteristics.

The content of the products stated under (c) and (d) above in the hardenable synthetic resin is of prime significance. This involves thermoplastics predominantly containing linear, high-molecular weight, reactive groups. These thermoplastics are essential for the handling properties of the coated substrate web and in particular ensure that the coating resins are adherencefree and that the substrate webs made therewith are flexible. An essential criterion of selection to ensure that the coating resin be transparent is that the thermoplastics employed are compatible with the hardenable polyester resins and that they form no optical boundary surfaces. An essential characteristic of these thermoplastics is their content of functional groups which react with others under the hardening conditions. Preferably these reactive groups are hydroxyl groups, or groups that release hydroxyl groups during reaction, for instance the esters of alcohols with carboxylic acids of low numbers of carbon atoms or the lower ethers of the hydroxy compounds. The following reactive groups furthermore are suitable: carboxylic groups or those which release carboxyl groups during reaction, or alkoxymethylamide groups, for instance the methoxymethylamide group, and amide or epoxy groups. Examples of high-molecular weight, reactive thermoplastics are polyvinyl alcohol, polyvinyl acetate, partially saponified polyvinyl acetate, possibly partially etherified polyvinyl alcohol, polyvinylacetals such as polyvinylformal or polyvinylbutyral, and also high molecular weight esters of acrylic and/or methacrylic acid, which contain the above-cited reactive groups.

The polyfunctional monomers cited under (d) above are of equally great significance for the properties of the coating resins to be used in accordance with the invention. They involve on one hand compounds containing at least one polymerizable double bond, and, on the other, in addition, at least another reactive group capable of reacting with the reactive groups of the thermoplastic under the conditions of hardening. The preferred reactive groups are amide or alkoxymethylamide groups, in particular the methoxymethylamide groups. Examples of suitable monomers are the amide or N-methoxymethylamide of acrylic or methacrylic acid. These monomers react on one hand by their polymerizing double bond with the hardenable polyester resin and are integrated in the latter during the reaction, and on the other hand by means of their reactive groups with the corresponding reactive one of the thermoplastic. Thereby, they cause a linkage between the thermoplastic and the polyester resin. In this manner the process products, especially in the hardened state, essentially differ from the process products of German Offenlegungsschrift No. 1,915,026.

As a consequence of linking the thermoplastic into the structure of the polyester resin, it follows that the chemical resistance of the hardened polyester resin film is retained and is not affected by the addition of the thermoplastic. Again, and surprisingly, there is no degradation in hardness and abrasion-resistance in the hardened and cured coating resin. An especial advantage is offered in that the substrate web coated with the coating resin is easily handled prior to resin hardening and in particular is free from brittleness.

It is apparent that the addition of monomers bonding the polyester resin and the thermoplastic is implemented within such limits that the amount and the functionality of the reactive groups is adjusted with respect to one another.

The coating resin of the invention furthermore may contain up to 5% by weight of etherified melamine-formaldehyde precondensate. Especially lower alcohols are used for etherification, such as butanol. This addition provides for even glossier surfaces.

The coating resin further contains a catalyst for hardening. The selection and the amount of the catalyst depends upon the optimal hardening under the conditions of processing on one hand and on the required storage life of the coating resin on the other. Organic peroxides such as aryl or arylalkyl peroxides and dialkylperalkylates were found to be particularly suitable. Again, slight amounts of acid catalysts may be added, for instance p-toluol sulfonic acid, to improve hardening and curing.

The coating resin may contain conventional ultraviolet stabilizers, antistatic agents and/or parting means. These additives, in general, are used to dissolve or disperse the synthetic resin/polymerizate mixture. The coating resin also may contain dyes or pigments and such flame-inhibiting synergists as antimony trioxide.

The weathering properties of the woodwork panels upgraded with the process products of the invention may be further significantly improved by impregnating the substrate webs with solutions of aminoplast resins. Preferably melamine-formaldehyde precondensates are used to that end. To retain and achieve the elasticity of the process products, however, only such an amount of aminoplast resin is used, which suffices for the complete enclosure of the cellulose fibers of the substrate web. This effect generally is achieved when from 50 to 100% by weight of aminoplast resin, based upon the weight of the paper, is introduced as a solid resin into the substrate web. No surface defects such as cracks or clouding occur even when there is exposure to heat, water and light. On account of this weathering capacity, the process products of the invention are particularly suitable for outdoor use.

The preparation of the coated substrate web may be carried out in known manner, namely by dissolving the ingredients of the coating resin in a solvent such as methylene chloride, methylethyl ketone, tetrahydrofuran, dioxane, acetone, methanol or mixtures thereof, and by pouring the solution obtained on a substrate web, especially one of paper. The solvent then is evaporated.

It is possible also to deposit the coating resin in the form of a dispersion.

If the substrate web is without aminoplast resin, then the resinification ratio assumes special significance for the processing of the synthetic resin coated substrate web. This ratio is given below by the quotient of resin weight (numerator) to weight of uncoated substrate web (denominator) and amounts to from 0.75 to 2.0, preferably 1.25 to 1.50. The optimal resinification ratio depends upon the resin absorptivity of the substrate web and must be determined by prior tests. It there is insufficient resin, the substrate web will be inadequately filled with resin when being processed under heat and pressure, whereby crack resistance will be decreased. Another consequence of insufficient resinification ratio is that the surface will not be closed. Excessively high resinification ratios decrease the economy of the synthetic resin coated substrate web of the invention.

The processing of the synthetic resin coated substrate web of the invention takes place conventionally, for instance in single level or multilevel surface presses. The required pressure amounts to 3 to 20 kg/cm$^2$, preferably between 3 and 10 kg/cm$^2$. The temperature, measured at the surface of the synthetic resin coated substrate web, should be between 125° and 160° C. The required time of processing depends upon the material to be finished, the processing temperature, and the particulars of the particular procedure. The time generally is between 2 and 10 minutes. Concerning pressure, temperature and time of processing, large deviations may be possible in special cases. Optimal conditions of processing therefore must be ascertained by a prior test in every case.

During processing, the synthetic resin coated substrate web is laid down in such manner that the coated side is the upper side. The joining of the synthetic resin coated substrate web and the material to be finished is implemented using a commercial adhesive which forms a cured adhesive seam between the material and the synthetic resin coated substrate web during processing under heat and pressure.

The structure of the finished material surface depends upon the surface nature of the pressing plate used. Rather than directly molding the structure of the pressing plate on the surface of the material finished with the synthetic resin coated substrate web of the invention, variously structured foils or plates imparting the desired structure also may be inserted between the pressing plate and the synthetic resin coated substrate web. In a special procedure of the state of the art, thermosetting plates (upper dies) are used as the structure-determining elements, where the surfaces represent the negatives of the structure desired on the finished material surface. Such structural negatives, for instance, may be obtained from wood panels or plywoods. In contrast however to the products of the state of the art, the details of such negatives may be reproduced in much greater detail because the use of an additional adhesive foil and/or a paper made abhesive, for instance an aluminum coated paper, can be eliminated between the substrate web and the structural molder. The products of the state of the art lack adhesiveless surfaces, so that an abhesive substrate web must be deposited to protect the synthetic resin, which can be removed from the hardened surface only following processing. It is, therefore, a special advantage that the synthetic resin coated substrate web of the invention is endowed with a non-adhesive surface, whereby special surface-protecting means are not required.

The invention will be further illustrated by reference to the following specific examples:

EXAMPLE 1

(a) Preparing a resin solution 65 parts by weight of a commerical polyester resin are dissolved in a mixture of 150 parts by weight of dichloromethane and 16 parts by weight of methanol. To this solution are added 22 parts by weight of a polyvinylformal, containing about 10% of acetal groups and 10% of free hydroxyl groups. Then, while stirring, 9 parts by weight of diallyl phthalate and 4 parts by weight of N-methoxymethyl methacrylamide are added. Once a clear, highly viscous solution is obtained, 3 parts by weight of butyl-etherified melamine resin, 0.3 part by weight of a 50% benzoylperoxide paste, 4.0 parts by weight of a 70% by weight solution of 2,5-dimethylhexane-2,5-diperisononanate, 0.3 part by weight of a commercial parting agent, and 0.3 part by weight of a commercial lightprotection agent are added. The solution so prepared has a shelf life of one week and remains constant in viscosity during that time.

(b) Preparing a synthetic resin coated substrate web

The resin solution prepared per Example 1(a) is poured by means of a pouring doctor on a substrate web of black paper with a specific weight of 60 g/m$^2$. The density of the deposited layer is 215–220 g/m$^2$. After evaporation of the solvent, a synthetic resin coated paper web with a total density of 140 g/m$^2$ is obtained. The resinification ratio therefore is 1.33.

In contrast to the products of the state of the art, both sides of the coated web of paper are entirely adhesion-free. The coated paper web is very elastic and has high mechanical strength. At 20° C., there is no change after storage for 6 months.

(c) Processing the synthetic resin coated substrate web (finishing the surface of a wood-chip panel)

The synthetic resin coated substrate web prepared per Example 1 (b) is used to finish a chip-board surface. A heated, hydraulic steel plate press is used. To obtain a wooden structure at the surface of the finished chip-board, a male die is used as the structure-molding element, which has a wood structure whereby the wood holes are raised pores, and the hard parts of the wood are represented by depressions in this die. This male die is equipped with a heat-resistant, hard, thermosetting melamine surface. It is provided with a commercial, hardened parting lacquer. The press assembly is composed of the following:

Heating plate—pressing pad—pressing plate—male die—synthetic resin coated paper web—commercial adhesive—chip-board—(white) melamine resin decorative film—pressing plate—pressing pad—heating plate.

The following pressing conditions were employed:

145° C.; 10 kg/cm$^2$ (10 bars); 10 minutes; no cooling of presses. The male die can be reused.

(d) Comparison Example

A black paper coated with a thermosetting polyester resin of the state of the art is used to finish a chip-board surface. In contrast to the synthetic resin coated substrate web of the invention, the polyester-coated paper web is covered with an aluminum foil. This is necessary to protect the adhesive surface of the polyester-coated paper web from dirt and to prevent the coated paper web from sticking to the roll. The aluminum foil will be removed only after the polyester-coated paper web is itself removed from the finished chip-board surface. For the remainder of the processing, the finishing of the chip-board surface is as described in Example 1(c).

(e) Testing the finished chip-boards

The chip-boards finished per 1(c) and 1(d) are both sealed on their surfaces. The surface finished with the synthetic resin coated substrate web of the invention compared to that finished with the polyester resin of the state of the art shows a pronounced wood structure; even the fine grain structure is easily seen. The latter is entirely lost in the state of the art because of the aluminum foil placed between the male die and the polyester surface. The following tests were applied to both finished chip-boards.

Spotting susceptibility per DIN 68 860
  exposure time: 1 hour
  Result: a slight loss in gloss is observed in both cases only for phenol
Steam-test per DIN 53 799
  Result: no change in either case
Abrasion test per DIN 53 799
  The table below lists the loss in weight in mg/revolutions

| revolutions | finished chip-board surface | |
| --- | --- | --- |
| | per example 1(c) | per example 1(d) |
| 0–100 | 57.5 | 71.6 |
| 100–200 | 64.2 | 71.4 |

-continued

| revolutions | finished chip-board surface | |
|---|---|---|
| | per example 1(c) | per example 1(d) |
| 200–300 | 61.5 | 66.5 |
| 300–400 | 61.3 | 68.8 |
| End of test per DIN 53 799 section 4.6.6.1 | 380 rotations | 380 rotations |

Hardness, ascertained on the Erichsen equipment and using a plastic roll, in both cases amounts to 150–200 p.

EXAMPLE 2

A synthetic resin solution is prepared per Example 1(a) and is poured by means of a pouring doctor on decorative paper of a deep-blue color and of a specific weight of 80 g/m². The density of the deposited layer is 270–275 g/m². After evaporating the solvent, a synthetic resin coated paper web is obtained with a density of 180 g/m². The resinification ratio therefore is 1.25. Both sides of the coated substrate web are entirely non-adhesive. The coated substrate web furthermore offers all of the advantages of that prepared per Example 1(b).

The synthetic resin coated substrate web is used to finish the surface of a laminated plate. A hydraulic steel plate press is used. To obtain a matte surface, a commercial polyvinyl fluoride foil 25 microns thick is inserted between the web and the pressing plate. The pressing assembly is composed of the following:

heating plate—pressing pad—pressing plate—polyvinyl fluoride foil (25 microns)—synthetic resin coated paper web—adhesive film—chip-board—(white) melamine resin decorative plate—pressing plate—pressing pad—heating plate.

The surface-finished laminated plate is silk-matte in its structure. The plate is subjected in a Xeno-Test apparatus (Model: Xenotest 1200 Original Hanau, 20 minutes, cycle=17 minute irradiation, 3 minutes rain per DIN 53 387) to short-term weathering testing. The plate remains unaffected even after 1,000 hours.

EXAMPLE 3

Preparing a melamine-resin impregnated and synthetic resin coated substrate web

A solid, deep-brown decorative paper with a surface specific weight of 80 g/m² is impregnated with a 50% by weight aqueous solution of a commercial melamine-formaldehyde precondensate and dried for 1 minute at 140° C. The impregnated web of paper retains 8% by weight of volatile ingredients, predominantly water. Its weight is 140 g/m².

A solution of synthetic resin prepared per Example 1(a) is poured from a pouring doctor on the web of paper so impregnated. After evaporating the solvent, the coated and impregnated web of paper has a weight of 190 g/m². The proportion of volatile ingredients is 5% by weight.

The synthetic resin coated web of paper so prepared is used for the finishing of a laminated plate as described in Example 2. However, processing does not involve a polyvinyl fluoride foil, rather the surface finish is provided by a highly polished, chromed steel plate.

The finished laminated plate has a high-gloss surface. No clouding at all may be observed. The decoration has a high gloss. The resistance to solvents is outstanding. When subjected to methylene chloride, there is a slight loss in gloss only after 2 hours. Testing per DIN 68 860 gives the same result as described in Example 1(e). The short weathering test per DIN 53 387, as described in Example 2, results in no visible degradation after 2,500 hours.

It will be obvious to those skilled in the art that many modifications may be made within the scope of the present invention without departing from the spirit thereof, and the invention includes all such modifications.

What is claimed is:

1. In a substrate web, coated with a thermosetting coating resin, in particular a web of paper, for the surface finishing of woodwork panels or laminates,
   the improvement wherein the coating resin is a modified polyester resin, composed of
   (a) 60 to 95% by weight of a hardenable polyester resin,
   (b) 1 to 15% by weight of a cross-linking agent for the polyester resin,
   (c) 5 to 40% by weight of a thermoplastic containing predominantly linear, high-molecular weight, reactive groups,
   (d) 1 to 15% by weight of a monomer with at least one polymerizable double bond and at least one group which reacts with the reactive group of the thermoplastic, and
   (e) a hardening catalyst.

2. A synthetic resin coated substrate web according to claim 1 in which the coating resin contains from 60 to 80% by weight of a hardenable polyester resin.

3. A synthetic resin coated substrate web according to claim 1 in which the coating resin contains from 5 to 10% by weight of a crosslinking agent for the polyester resin.

4. A synthetic resin coated substrate web according to claim 1 in which the coating resin contains from 10 to 25% by weight of a thermoplastic containing reactive groups.

5. A synthetic resin coated substrate web according to claim 1 in which the coating resin contains from 2 to 5% by weight of the at least bifunctional monomers recited in paragraph (d).

6. A synthetic resin coated substrate web according to claim 1 in which reactive groups of the thermoplastic are hydroxyl groups or groups which liberate hydroxyl groups under reaction conditions.

7. A synthetic resin coated substrate web according to claim 6 in which the monomer which reacts with the thermoplastic includes an amide group or an alkoxymethylamide group, as the reactive group.

8. A synthetic resin coated substrate web according to claim 7 in which the alkyl group of the alkoxymethylamide group is the methyl group.

9. A synthetic resin coated substrate web according to claim 1 in which the coating resin additionally contains up to 5% by weight of an etherified melamine-formaldehyde precondensate.

10. A synthetic resin coated substrate web according to claim 1 in which the aminoplast resin employed for impregnation is a melamine-formaldehyde precondensate.

11. A synthetic resin coated substrate web according to claim 1 in which the ratio of weight of resin on the substrate to its weight of paper when it is non-impregnated is between 0.75 to 2.0.

12. A synthetic resin coated substrate web according to claim 1 impregnated with an aminoplast resin.

13. A synthetic resin coated substrate web according to claim 1 in which the coating resin includes dyes, pigments, and/or fillers.

14. A process for preparing a synthetic resin coated substrate web according to claim 1 which comprises dissolving the components forming the coating resin in a common solvent or mixture of solvents, pouring the solution on a substrate web, and evaporating the solvent.

15. A process according to claim 14 in which the substrate web is impregnated with an aminoplast resin.

* * * * *